United States Patent [19]

Tanabe et al.

[11] Patent Number: 5,124,798
[45] Date of Patent: Jun. 23, 1992

[54] METHOD OF OUTPUTTING IMAGES IN A DIGITAL COPYING MACHINE UPON THE OCCURRENCE OF AN INPUT ERROR

[75] Inventors: Eiichi Tanabe; Hiroyuki Saito; Kazuhiro Oya, all of Kanagawa, Japan

[73] Assignee: Fuji Xerox Co., Ltd., Tokyo, Japan

[21] Appl. No.: 625,141

[22] Filed: Dec. 10, 1990

[51] Int. Cl.⁵ .............. H04N 1/21; H04N 1/04; H04N 1/23
[52] U.S. Cl. .................. 358/296; 358/300; 358/437; 358/450; 358/468; 355/314
[58] Field of Search .................. 355/313, 314; 358/76, 358/296, 437, 450, 468, 300

[56] References Cited

U.S. PATENT DOCUMENTS

| 4,099,860 | 7/1978 | Connin | 355/314 |
| 4,342,052 | 7/1982 | Rackley et al. | 358/450 |
| 4,511,241 | 4/1985 | Tsudaka et al. | 355/314 X |
| 4,920,427 | 4/1990 | Hirata | 358/437 |
| 4,958,232 | 9/1990 | Sugiura et al. | 358/300 |
| 4,967,266 | 10/1990 | Yamamoto | 358/76 |

Primary Examiner—Benjamin R. Fuller
Assistant Examiner—Eric Frahm
Attorney, Agent, or Firm—Finnegan, Henderson, Farabow, Garrett and Dunner

[57] ABSTRACT

A method of inputting images in digital copying machines comprises the steps of reading image data stored in a storing unit upon occurrence of an input error, and displaying or printing the read image data for a plurality of pages on a display screen or a recording sheet in arrayed form. Accordingly, the operator, when informed of how far the document has been read/stored, can not only handle a complex operation easily and correctly, but also can examine any undesired images such as images obliquely read although not subjected to input errors.

22 Claims, 7 Drawing Sheets

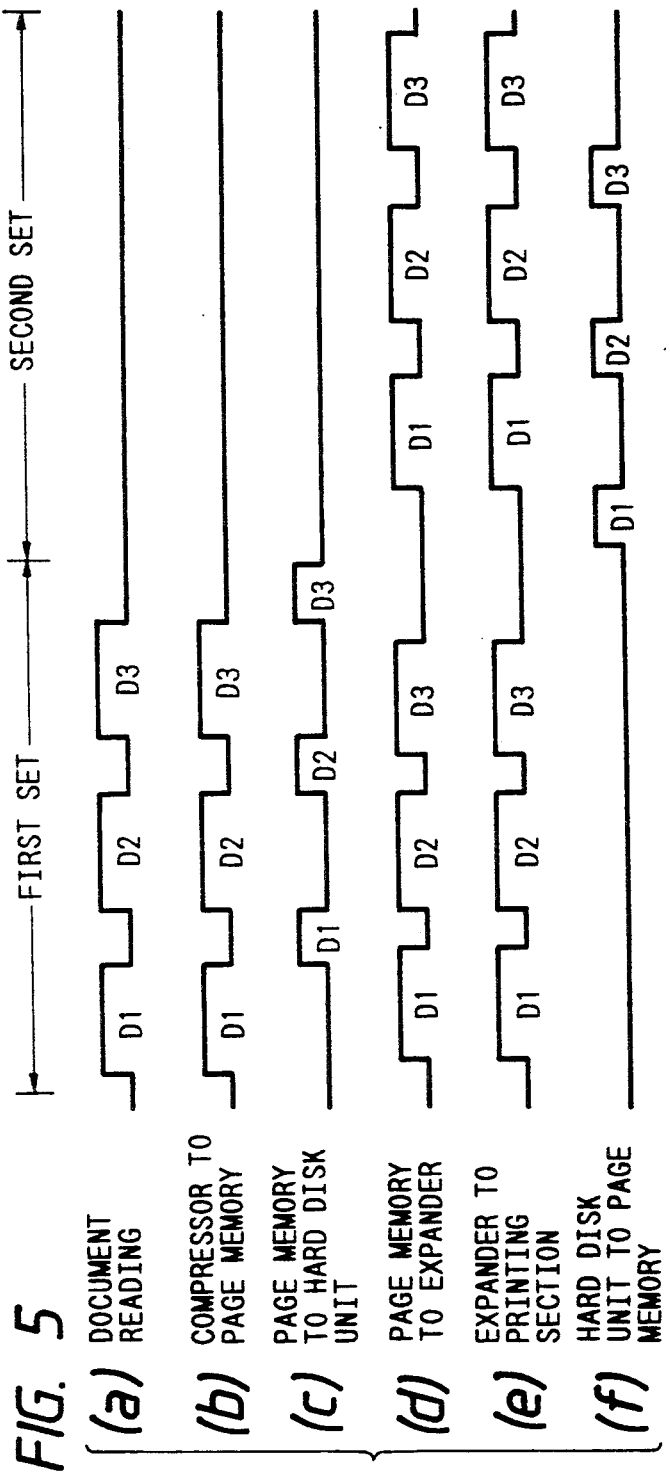

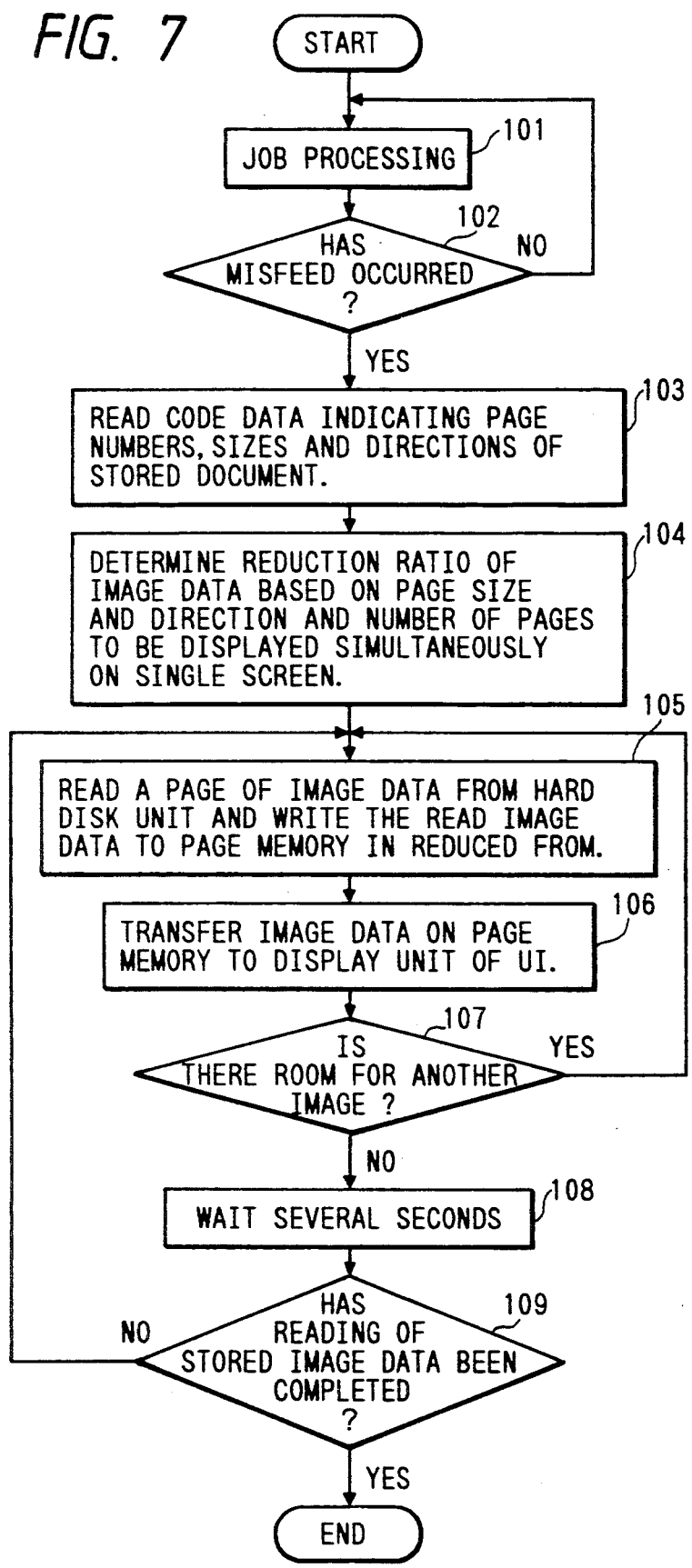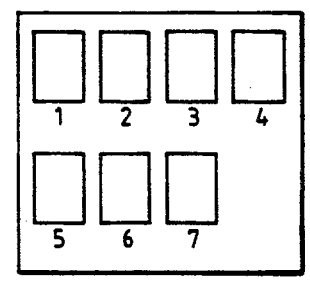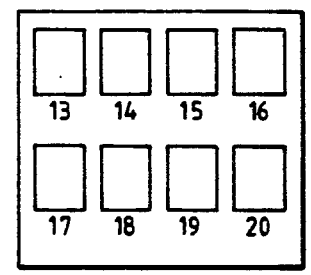

METHOD OF OUTPUTTING IMAGES IN A DIGITAL COPYING MACHINE UPON THE OCCURRENCE OF AN INPUT ERROR

BACKGROUND OF THE INVENTION

1. Field of the Invention

The invention relates to a method of outputting images in digital copying machines in which image data obtained by reading a document is temporarily stored and then printed on a recording sheet while read in a desired sequence.

2. Discussion of the Related Art

Ordinary electrophotographic copying machines (hereinafter referred to as "light-lens type electrophotographic copying machines") focus light reflected from a document on a photoreceptor using a lens to expose the photoreceptor and form latent electrostatic images thereon. The latent electrostatic images are then developed and formed into a toner image, and this toner image is then transferred onto a recording sheet thereby to produce a copy of the document.

A new type of electrophotographic copying machine, which is generally called a "digital copying machine," is attracting much attention. These digital copying machines operate by reading the image of a document (using, for example, an image-sensor-based image input unit) to obtain image signals, converting the obtained image signals into digital signals, processing the digitized image signals, and then forming the image corresponding to the document on a recording sheet using an image output unit such as a laser printer.

The digital copying machine processes image signals from the image input unit almost in real time and feeds the processed signals to the image output unit.

To increase the copying efficiency, the digital copying machine is also used in combination with an automatic document handler (ADH) or a recirculating automatic document handler (RDH).

Let us not take an example in which a digital copying machine equipped with an ADH prepares n copies of a document consisting of m pages in sorted form. Copying with an ordinary ADH not capable of recirculating documents requires that n copies be produced successively for each page of the document and that the produced copies be discharged sequentially into n different bins using a sorter, and this operation must be repeated m times to have a set of m-paged copies sorted in each bin. Copying with an RDH, on the other hand, allows the required number of copies to be produced in sorted form without using a sorter. That is, m pages of the document are copied sequentially once and the processed copies are discharged into a discharge tray, and thereafter, the document is recirculated as many times as the required number of copies. However, in the RDH, the document must go through belts and rollers so many times that it is much more likely to be damaged.

To overcome this shortcoming, it has been proposed that all the image data of the document be once stored in a large-capacity storing unit and that the stored data be read in a desired sequence to be output to a recording sheet.

For example, all the images in m pages of a document are read by the image input unit to obtain their image signals. The obtained image signals are then converted into corresponding digital signals and stored in a hard disk unit. If the stored digital signals are repeatedly read and output from the hard disk unit in the order of first, second, third, to mth pages, and so on, the required number (n) of copies can be prepared in sorted form by reading the document only once and without using a sorter.

Further, the image output unit of the copying machine may be used as a printer for another image data source, e.g., a work station, if it is arranged so that a job can be accepted from another image data source through a communication line and applied to the image output unit during a period in which a job is being read from the image input unit and stored in the storing unit. And upon end of the job from the work station, the stored image data of the document can be read from the storing unit and applied to the image output unit thereby to produce copies.

Accordingly, the shared use of the image output unit of the copying machine contributes to not only streamlining units of similar function but also eliminating wasteful wait times. The term "job" herein used is intended to mean a block of image data which is subjected to the same processing.

The light-lens type, or analog, copying machines and many digital copying machines of the prior art have their image input unit and image output unit operated almost in real time. As a result, when an input error occurs such as a misfeed at the ADH or damage of the document scanning section, the machines are stopped after the data read up to the occurrence of the error is printed. Thus, by analyzing the copies produced up to that moment, the operator can judge where to resume the operation.

In the above-mentioned digital copying machine, the image input unit and the image output unit operate asynchronously by storing the read images. The asynchronous operation improves productivity as well as performance with an electronic RDH. However, the operator still must check the produced copies upon interruption of the copying machine due to an input error to find the last stored page of the document due to the asynchronism between the input and output operations.

Thus, to resume the copying operation when the input error has been eliminated, there has been a problem of not knowing which page of the document to re-input.

SUMMARY OF THE INVENTION

The present invention has been made in view of the above circumstances and has as an object improving the method of inputting images so that digital copying machines, upon occurrence of an input error, can determine which is the last page of the document that has been stored and thus readily reset the document.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the method of this invention comprises the steps of reading the image data stored in a storing unit upon occurrence of an input error, and displaying or printing the read image data on a display screen or a recording sheet, respectively, in the form of an array of pages of the document.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings.

FIGS. 5(a) through 5(f) are timing charts explaining the operation of the digital copying machine shown in FIG. 1;

FIG. 6 is an explanatory diagram showing an exemplary structure of a code data table;

FIG. 7 is a flow chart depicting an exemplary processing when an input error occurs in the digital copying machine shown in FIG. 1;

FIG. 8 is an explanatory diagram showing an exemplary display on a display unit when an input error occurs in the digital copying machine shown in FIG. 1;

FIG. 10 is an explanatory diagram showing an exemplary display when the processing shown in the flow chart of FIG. 9 has been performed.

DETAILED DESCRIPTION OF THE PREFERRED EMBODIMENTS

In the present invention, upon occurrence of a fault during image input operation, image data stored up to that moment are read and developed in a page memory, e.g., in reduced form. The contents of the page memory are transferred to the image output unit and the images for a plurality of stored pages of the document are, e.g., printed on a single recording sheet in arrayed form. Alternatively, the images are displayed on the screen. Thus, a quick glance at such a printout or display allows the operator to readily check which pages of the document have been stored.

Figure 1:
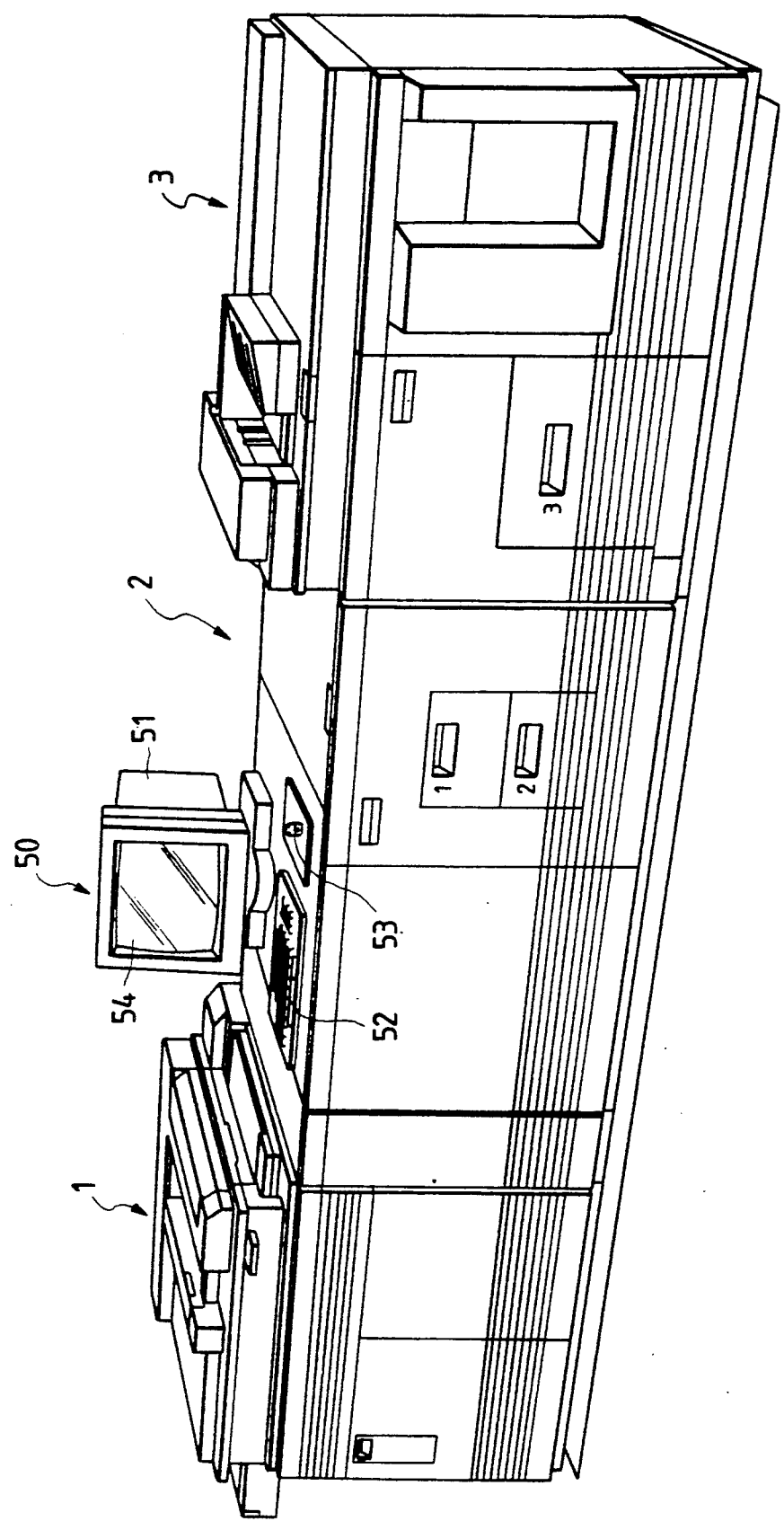
FIG. 1 is a general perspective view depicting a digital copying machine to which the teachings of the present invention are applied.

Referring to FIG. 1, there is shown a digital copying machine to which the teachings of the present invention are applied. The machine roughly comprises scanning section 1 for reading a document, control section 2 for governing the control of the total machine, and printing section 3 for printing images on recording sheets.

Figure 2:
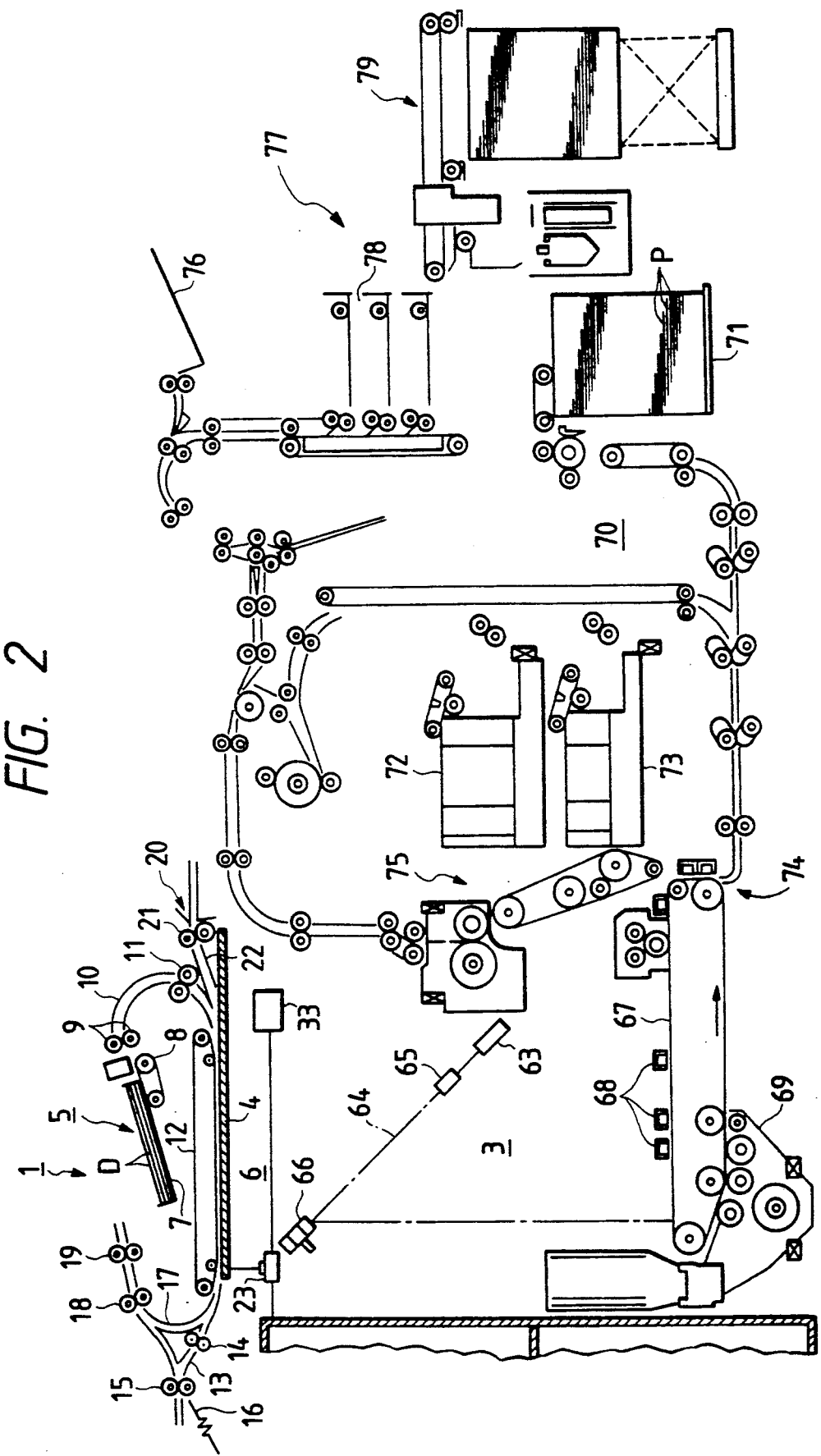
FIG. 2 is a schematic front view illustrating the internal structure of the digital copying machine shown in FIG. 1.

Referring to FIG. 2 which schematically shows the internal structure of the digital copying machine shown in FIG. 1, scanning section 1 comprises an automatic document handler 5 for automatically handling document D on transparent platen 4 and an image input unit 6 for reading images of document D placed on platen 4 for scanning.

Automatic document handler 5 allows, e.g., three different modes to be selected: a normal automatic document handling mode (ADH mode), a recirculating automatic handling mode (RDH mode), and a semi-automatic document handling mode (SADH mode).

In the normal ADH mode, document D is placed face-up on document tray 7 such that every sheet may be fed to vacuum feed belt 8 from the lowermost side. Document D is transferred to a predetermined position on platen 4 through document feed roller 9, bent chute 10, document feed roller 11, document feed belt 12, and the like. After being copied, document D is fed to a chute 13 by document feed belt 12 and discharged into catch tray 16 by document feed rollers 14 and 15. In the RDH mode, the copied document D is returned back to document tray 7 by document feed rollers 18 and 19 by passing through document return chute 17, instead of being directly discharged into catch tray 16. In the SADH mode, document D is inserted from document entry slot 20, fed between document feed belt 12 and platen 4, and transferred to a predetermined position by document feed belt 12.

The prescribed number of sheet sensors (not shown) are arranged along the document traveling path in automatic document handler 5 to detect the time that the front edge of a document passes their positions. If the time period between the start of document handling and the time at which the document front edge passes each sheet sensor is outside of a predetermined range, it is judged that the document handling has been incomplete and an error signal is output from automatic document handler 5. It is noted that this technique of detecting an erroneous operation in automatic document handler 5 is known in the art.

Figure 3:
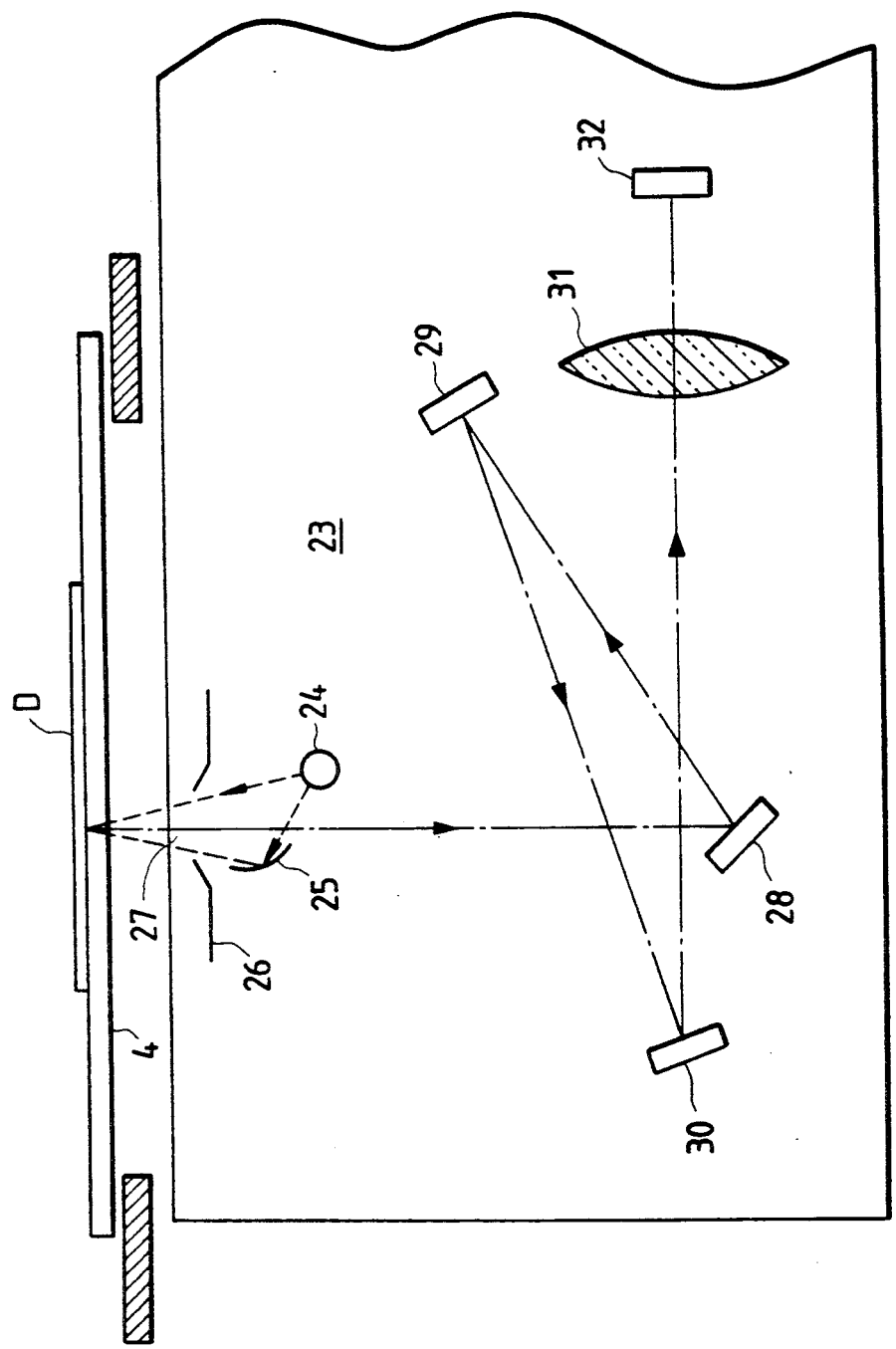
FIG. 3 is a schematic sectional view showing certain construction details of the document scanner for the digital copying machine shown in FIG. 1.

In image input unit 6, document scanner 23 is arranged at the lower portion of platen 4. FIG. 3 is a schematic sectional view showing certain construction details of the document scanner 23. Light from exposing lamp 24 is projected onto document D by passing through slit 27 formed on slit plate 26 directly or by being reflected by reflecting plate 25. The reflected light from document D is reflected by mirrors 28, 29, and 30 to change its path, and focused on line image sensor 32 via lens 31. Document scanner 23 thus comprises an exposing lamp 24, a reflecting plate 25, a slit plate 26, mirrors 28 to 30, and 32, a lens 31, and a line image sensor 32. Document scanner 23 is driven by scanning means 33 and performs reading of the images of document D on a page basis by reciprocating along the bottom surface of platen 4. Image sensor 32 sends a image signal corresponding to the image of document D.

A sheet sensor for detecting the position and timing of document placement is provided under platen 4 at the edge of the side from which the scanner starts to scan. Also provided is a scanning position sensor for detecting the position of document scanner 23. If it is detected that a document has not been fed on the correct position on platen 4 within a predetermined time period by automatic document handler 5, or if it is detected that document scanner 23 is in a position where it should not be, an error signal is output from image input unit 6. It is noted that this technique of detecting an erroneous operation in image input unit 6 is known in the art.

Figure 4:
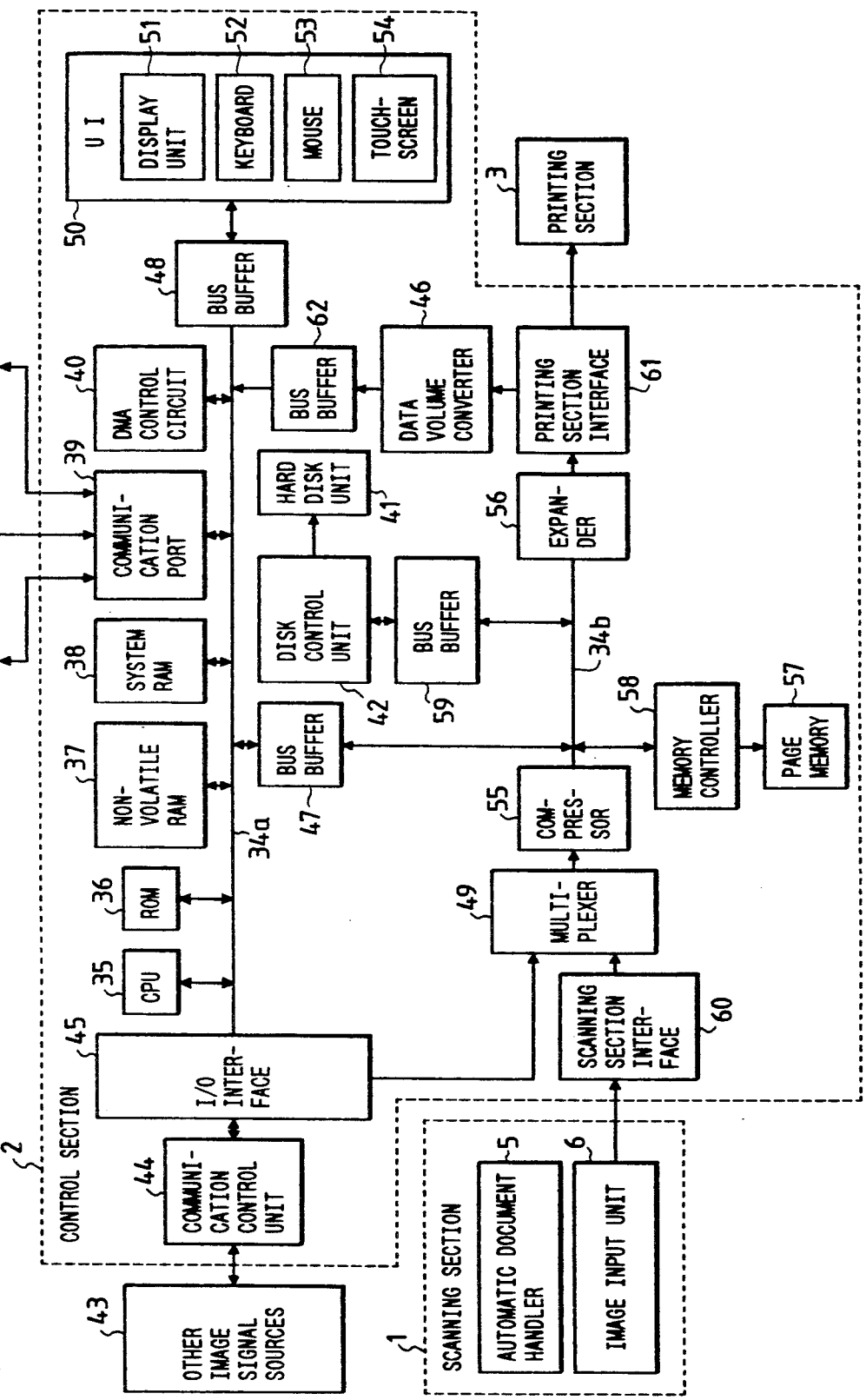
FIG. 4 is a block diagram showing the circuit of the digital copying machine shown in FIG. 1.

FIG. 4 shows a circuit of the digital copying machine shown in FIG. 1. The circuit is provided with system bus 34a and image data bus 34b. To system bus 34a are connected CPU (central processing unit) 35, ROM (read only memory) 36, nonvolatile RAM (random access memory) 37, system RAM 38, communication port 39, DMA (direct memory access) control circuit 40, disk control unit 42 for controlling read/write operation of hard disk unit 41, and the like. Input/output interface 45 is connected to system bus 34a. Input/output interface 45 serves to receive image data from another image data source 43 such as a personal computer, a work station, a facsimile machine through communication control unit 44. Image data bus 34b and user interface (UI) 50 are connected to system bus 34a through bus buffers 47 and 48, respectively.

UI 50 comprises display unit 51 capable of displaying an image on a pixel basis, keyboard 52, mouse 53, and the like. UI 50 serves to display such data as input instructions to the copying machine or operating conditions of the copying machine. Display unit 51 includes touch-screen 54, which, in addition to the operation by keyboard 52 and mouse 53, allows a desired input to be made by touching a predetermined icon displayed thereon by a finger.

Connected to the image data bus 34b are a compressor 55, an expander 56, and a page memory 57 connected through memory controller 58. Memory controller 58 controls the data development to page memory 57. For instance, it is used in editing processes such as rotating the read image by 90 or 180 degrees, and transferring image data of a plurality of pages from hard disk unit 41 to one bit-map memory plane and printing the image data. The data flow in and out of page memory 57 is controlled by DMA control circuit 40. Between image data bus 34b and disk control unit 42 there is provided bus buffer 59.

The compressor 55 is supplied with image data from scanning section 1 through scanning section interface 60 and multiplexer 49. Expander 56 outputs are fed to printing section 3 through printing section interface 61. Between printing section interface 61 and system bus 34a there are provided data volume converter 46 and bus buffer 62.

Printing section 3 is, e.g., a raster output scanner (ROS) of the laser printer type utilizing electrophotographic technology. As shown in FIG. 2, beam 64 from laser 63 is modulated in accordance with the image data by acousto-optic modulator 65 and made to scan (traverse) belt-like photoreceptor 67 by the mirrored facets of a rotating polygon mirror 66. Photoreceptor 67 is uniformly charged by a plurality of corotrons 68 and latent electrostatic images are formed thereon through exposure to the modulated laser beam. These latent electrostatic images are developed by developer 69 and, as a result, a toner image is formed on photoreceptor 67. This toner image on photoreceptor 67 is then transferred at transfer section 74 while positioned on recording sheet P brought forward at a predetermined timing either from main sheet feed tray 71 or auxiliary sheet feed trays 72 and 73 of sheet feeder 70, and output as an image on recording sheet P. Recording sheet P having the image transferred thereon is forwarded to fusing unit 75 where the toner image is fused, and a final copy is fed either to discharge tray 76 or finisher 77. Finisher 77 includes a stitcher 78 for stitching or stapling the copies together to form books and a thermal binder 79 for adhesively binding the copies into books.

For operation of the above described digital copying machine, a case in which automatic document handler 5 is operated in the ADH mode will be described.

An instruction to start copying is given by operating UI 50 such as keyboard 52, mouse 53, or touch-screen 54 shown in FIG. 1 or 4. Then, this instruction is fed to CPU 35 through bus buffer 48 and system bus 34a, and control data commands operation start is applied to automatic document handler 5 at scanning section 1 through communication port 39 in accordance with a program written in ROM 36. Document D resting face-up on document tray 7 is then picked up sheet by sheet by vacuum feed belt 8 from the lowermost side to be forwarded to a predetermined position on platen 4 through document feed roller 9, bent chute 10, document feed roller 11, document feed belt 12, and the like. Upon completion of the placement of document D, control data that commands operation start is applied in turn to image input unit 6 at scanning section 1 through communication port 39, and, as a result, document scanner 23 is moved along the bottom surface of platen 4 to read the image on document D and obtain the image data.

Image signals from scanning section 1, on one hand, are digitized by an image processing circuit (not shown) arranged within scanning section 1 and applied to control section 2 after being subjected to a predetermined image processing.

The image data from scanning section 1, on the other hand, is applied to compressor 55 through scanning section interface 60 and multiplexer 49. Compressor 55 performs, e.g., a reversible adaptive compression.

A case in which two or more copies are prepared for each of three pages of a document, $D_1$, $D_2$, $D_3$, will be described as an example. As shown in FIG. 5(a), three pages $D_1$, $D_2$, $D_3$ are sequentially read at scanning section 3 to obtain the image data corresponding to the images of the pages. Each image data thus obtained is compressed by compressor 55 and each compressed image data is written to page memory 57 by DMA transfer as shown in FIG. 5(b). To print each image for the second copy et seq., DMA transfer is employed to write the compressed image data from page memory 57 to hard disk unit 41 through bus buffer 59 and disk control unit 42 as shown in FIG. 5(c). As shown in FIG. 5(d), for the first copy of each document, the original image data is recovered by being transferred from page memory 57 to expander 56 through DMA.

As shown in FIG. 5(e), the image data expanded by expander 56 is then applied to printing section 3 through printing section interface 61. At printing section 3, beam 64 from laser 63 is modulated by the image data to form latent electrostatic images on photoreceptor 67. These latent electrostatic images are developed by developer 69 to be processed into a toner image, which is then transferred onto the recording sheet at transfer section 74, and then fused at fuser 75 and discharged into discharge tray 76. Accordingly, the images of the document are printed on the recording sheets in the order of pages $D_1$, $D_2$, $D_3$ to obtain their first copies.

From the second copies onward, no document reading and image data compression are performed. Each compressed image data written to hard disk unit 41 during processing of the first copy is read as shown in FIG. 5(f), transferred to page memory 57, and further transferred to expander 56 from page memory 57. The compressed image data thus transferred is expanded in the same manner as in the first copy and fed to printing section 3 where the second copies are produced.

By repeating the above operation, a desired number of copies are discharged into discharge tray 76 at printing section 3 in the order of $D_1$, $D_2$, $D_3$, $D_1$, $D_2$, $D_3$, . . . in sorted form. That is, an electronic RDH function is implemented.

When writing to hard disk unit 41, such data as the size and direction of each page read at scanning section 1 and the address at hard disk unit 41 in which each image data is stored are written to a code data table corresponding to the page number of each page of the document as shown in FIG. 6. This code data table is prepared in a buffer memory (not shown) or in nonvolatile RAM 37.

The operation at the time a document handling error occurs at automatic document handler 5 or at a time a scanning error occurs at image input unit 6 will now be described with reference to the flow chart shown in FIG. 7.

When an error occurs during processing of a job (Step 101) at scanning section 1, an error signal from automatic document handler 5 or image input unit 6 is transmitted to CPU 35 through communication port 39. Upon detection of the error occurring at scanning section 1 by CPU 35 (Step 102), an instruction to stop the operation is transmitted through communication port 39 to automatic document handler 5, image input unit 6, and printing section 3 in accordance with the program written in ROM 36. Thus, the operation of the copying machine is arrested immediately. And each image data stored in hard disk unit 41 up to that moment is read and expanded by expander 56, the code data table shown in FIG. 6 is referenced (Step 103), and each expanded image data is transmitted to memory controller 58 together with the corresponding page number and code data such as the page size and direction.

In the meantime, memory controller 58 sets the ratio of reduction in accordance with the number of pages simultaneously displayable on a single screen of display unit 51 of UI 50 and with the size and direction of the received image (Step 104) and, as a result, each image is reduced in accordance with the set ratio and developed in page memory 57 together with a bit pattern representing the corresponding page number (Step 105). That is, the more pages displayed at one time, the more the image must be reduced. Further, if display unit 51 has a landscape screen, the image must be reduced more in the horizontal direction than in the longitudinal direction. A user can arbitrarily determine the number of pages displayed at one time on the display screen depending on, e.g., the resolution of display unit 51 and the fineness (discrimination limit) the user requires. The bit pattern is stored in advance at a vacant area in page memory 57 with an address assigned and accessed by the code data received by memory controller 58.

Upon completion of the development of each image in page memory 57, the image data is thinned out by data volume converter 46 in accordance with the resolution of display unit 51, bypassing expander 56, and transferred to display 51 (Step 106). Accordingly, as shown in FIG. 8, the first page image data out of a plurality of image data stored in hard disk unit 41 is displayed on display unit 51 in reduced form with page number "1" appended thereto.

In the same way, as shown in FIG. 8, the images of the second page et seq. are displayed in arrayed form, and when the whole screen is used up by these images (Step 107), CPU 35 waits for an interval long enough for the operator to check the contents of the displayed images, e.g., several seconds (Step 108). If there still are other stored data (Step 109), CPU 35 returns to Step 105 and displays a next screen. Upon completion of displaying all the images; i.e., the image of the last page read has been displayed, CPU 35 returns and waits for an instruction to start copying.

Figure 9:
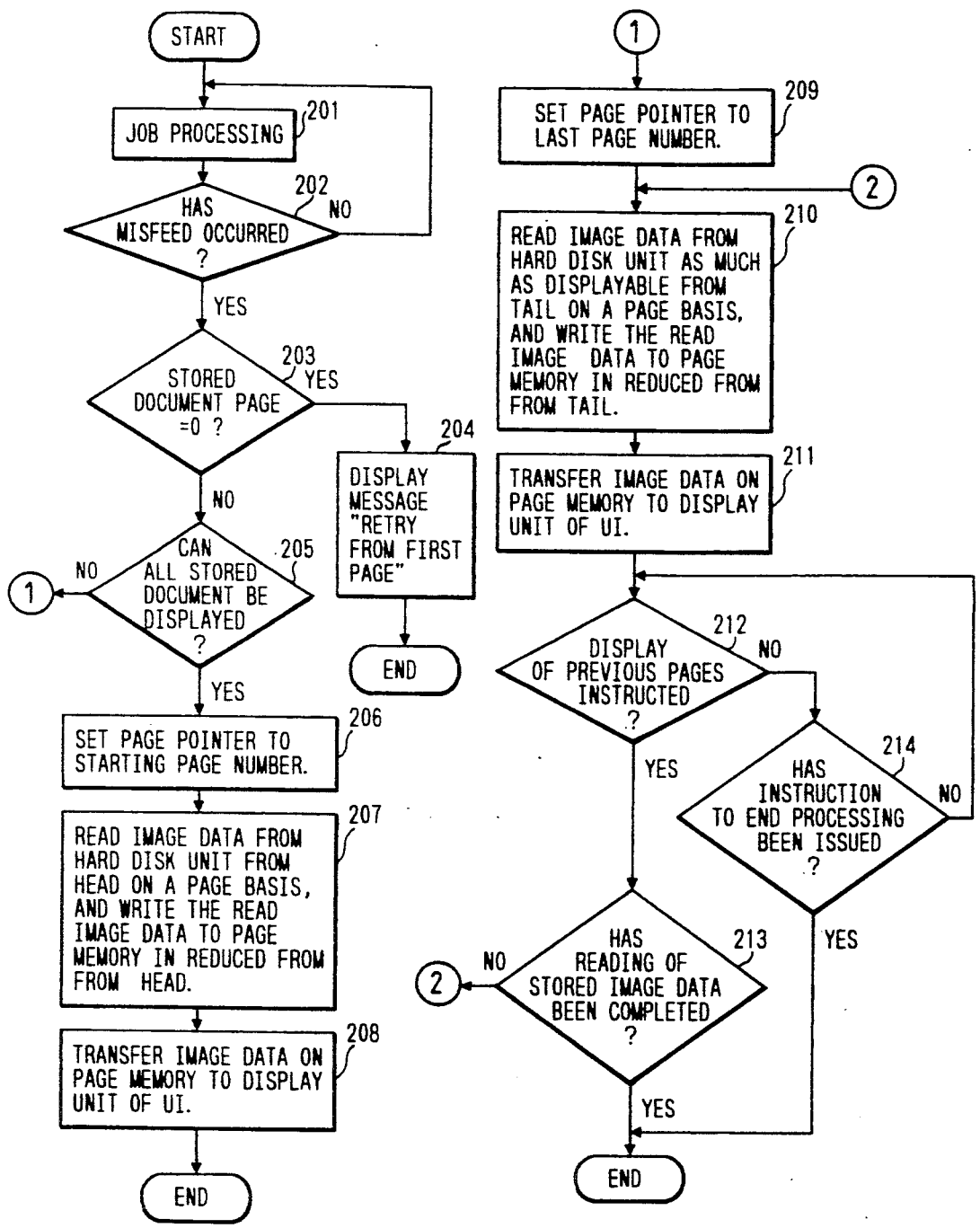
FIG. 9 is a flow chart depicting another exemplary processing when an input error occurs.

Referring now to FIG. 9, there is shown a flow chart showing another exemplary image display processing.

When an input error occurs (Step 202) during processing of a job (Step 201), the number of pages of a document already read is identified and if there is no stored image, i.e., the error has occurred during the processing of the first page of the document (Step 203), a message such as "NO PAGE HAS BEEN READ" or "RETRY FROM FIRST PAGE" will be directly displayed on display unit 51 of UI 50 under the control of CPU 35 (Step 204).

If one or more pages of the document have been read, whether or not all the images of the already read pages can be displayed on a single screen is judged (Step 205), and if it is possible, a page pointer for indicating the page number for each page to be displayed is set to the starting page, i.e., the first page (Step 206). Then, the image data is read from hard disk unit 41 on a page basis from head by incrementing the page pointer, and as in the same processing as described in FIG. 7, each read image is reduced and then written to page memory 57 from head (Step 207). The term "head" herein used is intended to mean an address corresponding to the upper left of a display screen, while "tail," an address corresponding to the bottom right. Successively, image data in page memory 57 are transferred to display unit 51, where the read pages are displayed. For example, when an error has occurred at the time the 8th page is being read, the images of the first to seven pages are displayed in reduced form with their page numbers appended as shown in FIG. 8. If necessary, there may be displayed in part of the screen, e.g., in its bottom part items such as a reason of the error and a procedure to be conducted by the operator to solve the error. In the case of the error exemplified above, a message such as "JAMMING OCCURRED" or "RETRY READING FROM 8TH PAGE" will be displayed.

If the images cannot be displayed simultaneously because of too many stored pages (Step 205), the page pointer is set to the last page that has been normally read (Step 209). And the image data is read from hard disk unit 41 on a page basis from tail by decrementing the page pointer, each read image is written to page memory 57 in reduced form from tail (Step 210), and then transferred to display unit 51 (Step 211). Accordingly, it is possible to display, e.g., eight pages of reduced images on a single screen, and thus, if an input error occurs at the time the 21st page is being read, the images from the 13th to 20th pages are displayed in reduced form together with their page numbers as shown in FIG. 10.

If it is requested by the operator from keyboard 52, mouse 53, or touch-screen 54 of UI 50 that pages before the currently displayed be displayed (Step 212) and if there still remain pages to be displayed (Step 213), CPU 35 returns to Step 210 and causes the eight pages immediately before, i.e., from 5th to 12th pages, to be displayed. All the pages back to the first page are displayed by repeating this operation. Upon instruction to terminate the processing, CPU 35 terminates the processing and waits for an instruction to start copying (Step 214).

If the images for a plurality of pages are displayed on display unit 51 and a desired page is selected from the displayed images by the operator through, e.g., touch-screen 54, CPU 35 references the code data table shown in FIG. 6 to obtain the image address of that page, directly accesses the image in hard disk unit 41, expands it by expander 56, and applies it to display unit 51 with its data volume reduced by data volume converter 46, whereby only the desired data can be displayed on display unit 51.

While the images read are displayed only on display unit 51 in the above embodiments, the images developed in page memory 57 can also be printed on a recording sheet by being directly applied to printing section 3 through printing section interface 61. In this case, the difference in image resolution between display unit 51 and printing section 3 brings about a difference in size of a visible image therebetween. That is, the resolution of a printout is higher and thus would permit reduction in higher ratio, thereby allowing the larger number of pages to be checked at once. Thus, the size and number of the images to be developed in page memory 57 may be adjusted in accordance with the printout whose resolution is higher, and only part of the stored pages may be displayed on display unit 51.

With the copying machine using the storing unit such as described above, an enormous amount of printouts must be produced from time to time. For example, if one or some pages of a document are not read due to erroneously forwarding successive pages at one time, it entails tremendous amount of labor to rearrange the printed copies. To avoid such an inconvenience, it is possible to check whether there is any missing page of the document by merely counting the number of pages in advance while feeding all the pages of the document by the automatic document handler without reading and storing them, and comparing the count of the pages thus fed with the number of pages actually read. The number of pages in this "dummy feeding" may be counted by causing the document scanner having an image sensor to remain fixed at a position where the document scanner is somewhat forwarded in a scanning direction and by detecting the tail end of each page by the image sensor, thereby allowing the pages to be counted on the image input unit side rather than on the automatic document handler side.

If the number of pages of the document is input from the UI, or if information indicating the number of pages of the document is written on the face of the document itself and the page number information is read, it is possible to detect the presence of a missing page by comparing such page number with the number of pages actually fed from the automatic document handler or with the actual number of pages of a set of copies produced at the printing section.

As described in the foregoing pages, the present invention allows the images of all the stored documents to be displayed when an input error occurs during reading/storing them. Accordingly, the operator, when informed of how far the document has been read/stored normally, can easily correct any errors that may occur. Moreover, since all the stored documents are displayed, it is possible to examine any undesired images such as images obliquely read although not subjected to input errors.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. In a copying machine wherein image data is obtained by sequentially reading pages of a document input in the copying machine, and wherein the image data is stored in a storing unit and then read from the storing unit in a desired sequence such that the image data is transferred to an image output unit for printing copies of the document pages in the desired sequence, a method comprising the steps of:
   automatically reading said image data stored in said storing unit upon occurrence of an image data input error;
   displaying the read image data on a display screen in a form of an array of pages of said document; and
   printing the read image data on a recording sheet in the form of an array of pages of said document.

2. In a copying machine wherein image data is obtained by sequentially reading pages of a document input in the copying machine, and wherein the image data is stored in a storing unit and then read from the storing unit in a desired sequence such that the image data is transferred to an image output unit for printing copies of the document pages in the desired sequence, a method comprising the steps of:
   automatically reading said image data stored in said storing unit upon occurrence of an image data input error;
   displaying the read image data on a display screen in a form of an array of pages of said document, said array of pages of said document consisting of a subset of a total number of pages read before the occurrence of said image data input error.

3. The method of claim 2, wherein said subset of pages includes a last page read before the occurrence of said image data input error.

4. The method of claim 3, wherein said subset of pages includes a first page of the document.

5. In a copying machine wherein image data is obtained by sequentially reading pages of a document input in the copying machine, and wherein the image data is stored in a storing unit and then read from the storing unit in a desired sequence such that the image data is transferred to an image output unit for printing copies of the document pages in the desired sequence, a method comprising the steps of:
   automatically reading said image data stored in said storing unit upon occurrence of an image data input error;
   displaying the read image data on a display screen in a form of an array of pages of said document, said array of pages of said document consisting of reduced images of each page read before the occurrence of said image data input error.

6. The method of claim 5, wherein said reduced images are produced by determining a number of pages that may be clearly imaged on said display screen at one time based on a resolution of said display screen, and reducing the image of each page such that a maximum number of pages may be clearly displayed on said display screen at one time.

7. In a copying machine wherein image data is obtained by sequentially reading pages of a document input in the copying machine, and wherein the image data is stored in a storing unit and then read from the storing unit in a desired sequence such that the image data is transferred to an image output unit for printing copies of the document pages in the desired sequence, a method comprising the steps of:

automatically reading said image data stored in said storing unit upon occurrence of an image data input error;

displaying the read image data on a display screen in a form of an array of pages of said document; and displaying page numbers corresponding to the pages displayed in said array on said display screen.

8. In a copying machine wherein image data is obtained by sequentially reading pages of a document input in the copying machine, and wherein the image data is stored in a storing unit and then read from the storing unit in a desired sequence such that the image data is transferred to an image output unit for printing copies of the document pages in the desired sequence, a method comprising the steps of:

automatically reading said image data stored in said storing unit upon occurrence of an image data input error;

displaying the read image data on a display screen in a form of an array of pages of said document; and displaying a message on said display screen indicating a type of input error that occurred and a page number of a last page completely read.

9. In a copying machine wherein image data is obtained by sequentially reading pages of a document input in the copying machine, and wherein the image data is stored in a storing unit and then read from the storing unit in a desired sequence such that the image data is transferred to an image output unit for printing copies of the document pages in the desired sequence, a method comprising the steps of:

automatically reading said image data stored in said storing unit upon occurrence of an image data input error; and printing the read image data on a recording sheet in a form of an array of pages of said document.

10. The method of claim 9, further comprising the step of:

displaying the read image data on a display screen in the form of an array of pages of said document.

11. The method of claim 9, wherein said array of pages of said document consists of a subset of a total number of pages read before the occurrence of said image data input error.

12. The method of claim 12, wherein said subset of pages includes a last page read before the occurrence of said image data input error.

13. The method of claim 12, wherein said subset of pages includes a first page of the document.

14. The method of claim 10, wherein said array of pages of said document consists of reduced images of each page read before the occurrence of said image data input error.

15. The method of claim 15, wherein said reduced images are produced by determining a number of pages that may be clearly printed on said recording sheet at one time based on a resolution of said image output unit, and reducing the image of each page such that a maximum number of pages may be clearly printed on said recording sheet at one time.

16. The method of claim 9, further comprising the step of:

printing page numbers corresponding to the pages displayed in said array on said recording sheet.

17. The method of claim 9, further comprising the step of:

printing a message on said recording sheet indicating a type of input error that occurred and a page number of a last page completely read.

18. In a copying machine wherein image data is obtained by sequentially reading pages of a document input in the copying machine, and wherein the image data is stored in a storing unit and then read from the storing unit in a desired sequence such that the image data is transferred to an image output unit for printing copies of the document pages in the desired sequence, a method comprising the steps of:

automatically reading said image data stored in said storing unit upon occurrence of an image data input error; and displaying the read image data on a display screen in a form of a plurality of arrays of pages of said document which are sequentially displayed on said display screen.

19. The method of claim 18, wherein each of said plurality of arrays consist of mutually exclusive subsets of a total number of pages read before the occurrence of said image data input error.

20. The method of claim 18, wherein any one of said plurality of arrays may be selectively displayed on said display screen.

21. In a copying machine wherein image data is obtained by sequentially reading pages of a document input in the copying machine, and wherein the image data is stored in a storing unit and then read from the storing unit in a desired sequence such that the image data is transferred to an image output unit for printing copies of the document pages in the desired sequence, a method comprising the steps of:

automatically reading said image data stored in said storing unit upon occurrence of an image data input error; and printing the read image data on recording sheets in a form of a plurality of arrays of pages of said document which are sequentially printed on said recording sheets.

22. The method of claim 2, wherein each of said plurality of arrays consist of mutually exclusive subsets of a total number of pages read before the occurrence of said image data input error.

* * * * *

UNITED STATES PATENT AND TRADEMARK OFFICE
CERTIFICATE OF CORRECTION

PATENT NO.   : 5,124,798
DATED        : June 23, 1992
INVENTOR(S)  : Eiichi Tanabe et al.

It is certified that error appears in the above-identified patent and that said Letters Patent is hereby corrected as shown below:

Claim 4, column 10, line 42, change "claim 3" to --claim 2--.

Claim 12, column 11, line 54, change "claim 12" to --claim 11--.

Claim 13, column 11, line 57, change "claim 12" to --claim 11--.

Claim 14, column 11, line 59, change "claim 10" to --claim 9--.

Claim 15, column 12, line 3, change "claim 15" to --claim 14--.

UNITED STATES PATENT AND TRADEMARK OFFICE
CERTIFICATE OF CORRECTION

PATENT NO. : 5,124,798
DATED : June 23, 1992
INVENTOR(S) : Eiichi Tanabe, et al

It is certified that error appears in the above-indentified patent and that said Letters Patent is hereby corrected as shown below:

Claim 22, column 12, line 56, change "claim 2" to --claim 21--.

Signed and Sealed this

Fifth Day of October, 1993

Attest:

BRUCE LEHMAN

*Attesting Officer*   *Commissioner of Patents and Trademarks*